United States Patent
Rickard et al.

(10) Patent No.: US 10,318,398 B2
(45) Date of Patent: *Jun. 11, 2019

(54) DATA PIPELINE MONITORING

(71) Applicant: Palantir Technologies Inc., Palo Alto, CA (US)

(72) Inventors: Jesse Rickard, Kingston (AU); Peter Maag, New York City, NY (US); Jared Newman, New York City, NY (US); Giulio Mecocci, London (GB); Harish Subbanarasimhia, San Francisco, CA (US); Adrian Marius Dumitran, Bucharest (RO); Andrzej Skrodzki, Palo Alto, CA (US); Jonah Scheinerman, Ann Arbor, MI (US); Gregory Slonim, Burke, VA (US); Alexandru Viorel Antihi, Surrey (GB)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,258

(22) Filed: Apr. 26, 2017

(65) Prior Publication Data

US 2017/0357562 A1     Dec. 14, 2017

Related U.S. Application Data

(63) Continuation of application No. 15/225,738, filed on Aug. 1, 2016, now Pat. No. 9,678,850.

(Continued)

(51) Int. Cl.
*G06F 11/32* (2006.01)
*G06F 16/17* (2019.01)
(Continued)

(52) U.S. Cl.
CPC ............ *G06F 11/328* (2013.01); *G06F 9/542* (2013.01); *G06F 11/3024* (2013.01);
(Continued)

(58) Field of Classification Search
None
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |

(Continued)

FOREIGN PATENT DOCUMENTS

| | | |
|---|---|---|
| DE | 102014103482 | 9/2014 |
| DE | 102014213036 | 1/2015 |

(Continued)

OTHER PUBLICATIONS

"A Quick Guide to UniProtKB Swiss-Prot & TrEMBL," Sep. 2011, pp. 2.

(Continued)

*Primary Examiner* — Syed A Roni
(74) *Attorney, Agent, or Firm* — Hickman Palermo Becker Bingham LLP

(57) ABSTRACT

A method and system for data pipeline monitoring receives an event data object and a current status data object from one or more subsystems of a pipeline. The system analyzes the event data object and the current status data object to determine a first and second validation value. The system, in response to determining that either the first or second validation value is not valid, sends a notification.

20 Claims, 8 Drawing Sheets

Related U.S. Application Data

(60) Provisional application No. 62/348,611, filed on Jun. 10, 2016.

(51) Int. Cl.

| | | |
|---|---|---|
| *G06F 9/54* | (2006.01) | |
| *G06F 11/30* | (2006.01) | |
| *G06F 11/34* | (2006.01) | |
| *G06F 3/0481* | (2013.01) | |
| *G06T 11/20* | (2006.01) | |

(52) U.S. Cl.
CPC ...... *G06F 11/3409* (2013.01); *G06F 16/1734* (2019.01); *G06F 3/0481* (2013.01); *G06T 11/206* (2013.01)

(56) References Cited

U.S. PATENT DOCUMENTS

| | | |
|---|---|---|
| 5,911,138 A | 6/1999 | Li et al. |
| 5,918,225 A | 6/1999 | White et al. |
| 6,057,757 A | 5/2000 | Arrowsmith et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,117,430 B2 | 10/2006 | Maguire et al. |
| 7,155,728 B1 | 12/2006 | Prabhu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,739,246 B2 | 6/2010 | Mooney et al. |
| 7,783,679 B2 | 8/2010 | Bley |
| 7,853,573 B2 | 12/2010 | Warner et al. |
| 7,877,421 B2 | 1/2011 | Berger et al. |
| 7,895,565 B1 | 2/2011 | Hudgons et al. |
| 7,908,521 B2 | 3/2011 | Sridharan et al. |
| 7,912,930 B1 | 3/2011 | Farooqui et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,601,326 B1 | 12/2013 | Kirn |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,678,850 B1 | 6/2017 | Rickard et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0117387 A1 | 6/2004 | Civetta et al. |
| 2004/0126840 A1 | 7/2004 | Cheng et al. |
| 2004/0139212 A1 | 7/2004 | Mukherjee et al. |
| 2004/0193608 A1 | 9/2004 | Gollapudi et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0251786 A1 | 11/2005 | Citron et al. |
| 2005/0278286 A1 | 12/2005 | Djugash et al. |
| 2006/0004740 A1 | 1/2006 | Dettinger et al. |
| 2006/0069717 A1 | 3/2006 | Mamou et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0161558 A1 | 7/2006 | Tamma et al. |
| 2006/0209085 A1 | 9/2006 | Wong et al. |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0104407 A1 | 5/2008 | Horne et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2009/0319418 A1 | 12/2009 | Herz |
| 2010/0011282 A1 | 1/2010 | Dollard et al. |
| 2010/0073315 A1 | 3/2010 | Lee et al. |
| 2010/0082671 A1 | 4/2010 | Li et al. |
| 2010/0094829 A1 | 4/2010 | Castellanos et al. |
| 2010/0125470 A1 | 5/2010 | Chisholm |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0211550 A1 | 8/2010 | Daniello et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0246826 A1 | 10/2011 | Hsieh et al. |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |

(56) References Cited

U.S. PATENT DOCUMENTS

| | | |
|---|---|---|
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2012/0290879 A1 | 11/2012 | Shibuya et al. |
| 2013/0006947 A1 | 1/2013 | Olumuyiwa et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0091084 A1 | 4/2013 | Lee |
| 2013/0096968 A1 | 4/2013 | Van Pelt et al. |
| 2013/0198565 A1 | 8/2013 | Mancoridis et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0251233 A1 | 9/2013 | Yang et al. |
| 2014/0012886 A1 | 1/2014 | Downing et al. |
| 2014/0040182 A1 | 2/2014 | Gilder et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0012509 A1 | 1/2015 | Kirn |
| 2015/0074050 A1 | 3/2015 | Landau et al. |
| 2015/0188715 A1 | 7/2015 | Castellucci et al. |
| 2015/0256617 A1 | 9/2015 | Klose et al. |
| 2015/0301861 A1 | 10/2015 | LaChiusa et al. |
| 2016/0092476 A1 | 3/2016 | Stojanovic et al. |
| 2016/0246809 A1 | 8/2016 | Romano et al. |
| 2017/0351989 A1 | 12/2017 | Langdon |
| 2018/0032706 A1 | 2/2018 | Fox et al. |

FOREIGN PATENT DOCUMENTS

| | | |
|---|---|---|
| EP | 1566758 | 8/2005 |
| EP | 1647908 | 4/2006 |
| EP | 1962222 | 8/2008 |
| EP | 2551799 | 1/2013 |
| EP | 2634745 | 9/2013 |
| EP | 2743839 | 6/2014 |
| EP | 2778986 | 9/2014 |
| EP | 2897051 | 7/2015 |
| EP | 3255568 | 12/2017 |
| GB | 2366498 | 3/2002 |
| GB | 2508503 | 1/2015 |
| GB | 2517582 | 2/2015 |
| GB | 2508293 | 4/2015 |
| NL | 2013134 | 1/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2005/010685 | 2/2005 |
| WO | WO 2010/030917 | 3/2010 |
| WO | WO 2011/017289 | 5/2011 |
| WO | WO 2011/071833 | 6/2011 |
| WO | WO 2012/079836 | 6/2012 |
| WO | WO 2013/067077 | 5/2013 |

OTHER PUBLICATIONS

"A Tour of Pinboard," <http://pinboard.in/tour> as printed May 15, 2014 in 6 pages.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delcher et al., "Identifying Bacterial Genes and Endosymbiont DNA with Glimmer," Biolnformatics, vol. 23, No. 6, 2007, pp. 673-679.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

"Frequently Asked Questions about Office Binder 97," http://web.archive.org/web/20100210112922/http://support.microsoft.com/kb/843147 printed Dec. 18, 2006 in 5 pages.

Goldstein et al., "Stacks Lazy Threads: Implementing a Fast Parallel Call," Journal of Parallel and Distributed Computing, Jan. 1, 1996, pp. 5-20.

Han et al., "Efficient Computation of Iceberg Cubes with Complex Measures," ACM Sigmod, May 21-24, 2001, pp. 1-12.

Ivanova et al., "An Architecture for Recycling Intermediates in a Column-Store," Proceedings of the $35^{th}$ Sigmod International Conference on Management of Data, Sigmod '09, Jun. 29, 2009, p. 309.

Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Johnson, Steve, "Access 2013 on demand," Access 2013 on Demand, May 9, 2013, Que Publishing.

Kahan et al., "Annotea: an Open RDF Infastructure for Shared Web Annotations", Computer Networks, Elsevier Science Publishers B.V., vol. 39, No. 5, dated Aug. 5, 2002, pp. 589-608.

Karp et al., "A Simple Algorithm for Finding Frequent Elements in Streams and Bags," ACM Transactions on Database Systems, vol. 28, No. 1, Mar. 2003, pp. 51-55.

Kitts, Paul, "Chapter 14: Genome Assembly and Annotation Process," The NCBI Handbook, Oct. 2002, pp. 1-21.

Leela et al., "On Incorporating Iceberg Queries in Query Processors," Technical Report, TR-2002-01, Database Systems for Advanced Applications Lecture Notes in Computer Science, 2004, vol. 2973.

Liu et al., "Methods for Mining Frequent Items in Data Streams: An Overview," Knowledge and Information Systems, vol. 26, No. 1, Jan. 2011, pp. 1-30.

Madden, Tom, "Chapter 16: The BLAST Sequence Analysis Tool," The NCBI Handbook, Oct. 2002, pp. 1-15.

Mendes et al., "TcruziKB: Enabling Complex Queries for Genomic Data Exploration," IEEE International Conference on Semantic Computing, Aug. 2008, pp. 432-439.

Mizrachi, Ilene, "Chapter 1: GenBank: The Nuckeotide Sequence Database," The NCBI Handbook, Oct. 2002, pp. 1-14.

Smart et al., "A Visual Approach to Semantic Query Design Using a Web-Based Graphical Query Designer," 16th International Conference on Knowledge Engineering and Knowledge Management (EKAW 2008),ÈAcitrezza, Catania, Italy, Sep. 29-Oct. 3, 2008, pp. 16.

Stamos et al., "Remote Evaluation," Journal ACM Transactions on Programming Languages and Systems (TOPLAS) vol. 12, Issue 4, Oct. 1990, pp. 537-564.

"The FASTA Program Package," fasta-36.3.4, Mar. 25, 2011, pp. 29.

(56) References Cited

OTHER PUBLICATIONS

Wollrath et al., "A Distributed Object Model for the Java System," Proceedings of the 2nd Conference on USENEX, Conference on Object-Oriented Technologies (COOTS), Jun. 17, 1996, pp. 219-231.
Pythagoras Communications Ltd., "Microsoft CRM Duplicate Detection," Sep. 13, 2011, https://www.youtube.com/watch?v=j-7Qis0D0Kc.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
Official Communication for New Zealand Patent Application No. 622414 dated Mar. 24, 2014.
Notice of Acceptance for New Zealand Patent Application No. 622485 dated Nov. 24, 2014.
Notice of Acceptance for New Zealand Patent Application No. 616212 dated Jan. 23, 2015.
Notice of Acceptance for New Zealand Patent Application No. 616299 dated Apr. 7, 2015.
Official Communication for New Zealand Patent Application No. 622484 dated Apr. 2, 2014.
Official Communication for New Zealand Patent Application No. 627061 dated Jul. 14, 2014.
Official Communication for European Patent Application No. 14159175.0 dated Jul. 17, 2014.
Official Communication for European Patent Application No. 14159629.6 dated Jul. 31, 2014.
Official Communication in New Zealand Application No. 627962 dated Aug. 5, 2014.
Official Communication for European Patent Application No. 14159629.6 dated Sep. 22, 2014.
Official Communication for Canadian Patent Application No. 2807899 dated Oct. 24, 2014.
Official Communication for New Zealand Patent Application No. 622485 dated Nov. 21, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Australian Patent Application No. 2013237710 dated Jan. 16, 2015.
Official Communication for New Zealand Patent Application No. 616299 dated Jan. 26, 2015.
Official Communication for Australian Patent Application No. 2013237658 dated Feb. 2, 2015.
Official Communication for Australian Patent Application No. 2014201580 dated Feb. 27, 2015.
Official Communication for German Patent Application No. 10 2013 221 057.4 dated Mar. 23, 2015.
Official Communication for German Patent Application No. 10 2013 221 052.3 dated Mar. 24, 2015.
Official Communication for European Patent Application No. 14199180.2 dated Aug. 31, 2015.
Official Communication for Netherlands Patent Application No. 2013134 dated Apr. 20, 2015.
Official Communication for Canadian Patent Application No. 2829266 dated Apr. 28, 2015.
Official Communication for Canadian Patent Application No. 2828264 dated Apr. 28, 2015.
Official Communication for Australian Patent Application No. 2014203669 dated Jan. 21, 2016.
Official Communication for European Patent Application No. 14199180.2 dated Jun. 22, 2015.
Official Communication for Canadian Patent Application No. 2807899 dated Jul. 20, 2015.
Official Communication for Netherlands Patent Application No. 2011613 dated Aug. 13, 2015.
Official Communication for Netherlands Patent Application No. 2011627 dated Aug. 14, 2015.
Perry, Frances, "Sneak Peek: Google Cloud Dataflow, a Cloud-Native Data Processing Service," Jun. 26, 2014, pp. 1-5.
"LabKey Server 16.2," Jul. 15, 2016, retrieved from https://www.labkey.org/Documentation/Archive/16.2/project-begin.view? on Oct. 4, 2017.
Prabhakar, Arvind, "Apache Flume," Architecture of Flume NG, Dec. 9, 2011, pp. 1-14.
Official Communication for European Patent Application No. 17183768.5 dated Oct. 19, 2017.
European Patent Office, "Search Report" in application No. 17168183.3-1507 dated Oct. 5, 2017, pages.
European Claims in application No. 17168183.6-1507, dated Oct. 2017, 3 pages.
Frances Perry, Sneak Peek: Google Cloud Dataflow, a Cloud-Native Data Processing Service, dated Jun. 26, 2014, 5 pages.

DATA PIPELINE MONITORING

CROSS-REFERENCE TO RELATED APPLICATIONS; BENEFIT CLAIM

This application claims the benefit of Provisional Application No. 62/348,611, filed Jun. 10, 2016, the entire contents of which is hereby incorporated by reference as if fully set forth herein, under 35 U.S.C. § 119(e). This application claims the benefit as a Continuation of U.S. patent application Ser. No. 15/225,738, filed Aug. 1, 2016, now U.S. Pat. No. 9,678,850 B1, the entire contents of which is hereby incorporated by reference as if fully set forth herein, under 35 U.S.C. § 120. This application is related to "Pluggable Fault Detection Tests for Data Pipelines" by Maag et al., filed Oct. 7, 2015, U.S. application Ser. No. 14/877,229, which is hereby incorporated by reference as though fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates to computers that are programmed to process data pipelines. More specifically, the disclosure relates to computers that are programmed to monitor the status of data pipeline subsystems.

BACKGROUND

In computer systems, a pipeline is a set of one or more coupled pipeline subsystems that process and/or analyze data. Each pipeline subsystem consists of computer programs or dedicated computers that receive data from a source, process or transform the data, and forward the data to another program, computer or system. Such pipelines can be particularly fragile as any issue encountered at one pipeline subsystem, such as misformatted data, incomplete data, or limited computing resources, can cause the other pipeline subsystems to fail or suffer from degraded performance. Therefore, some form of monitoring would be useful, but existing systems have not provided effective solutions.

Traditional monitoring solutions focus on one of two aspects of monitoring. Event monitoring focuses on historical event data of the pipeline, such as can be found via system log files, job success results, etc. Current status monitoring focuses on a current snapshot of the pipeline, such as the amount of existing disk space, amount of data flowing through the pipeline, amount of available computer processing power, etc. Separating event monitoring from current status monitoring can make it difficult to see and understand the entire context of the health of a pipeline.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) the present invention. It will be apparent, however, that the example embodiment(s) may be practiced without these specific details. In other instances, well-known structures and devices are shown in block diagram form in order to avoid unnecessarily obscuring the example embodiment(s).

1.0 General Overview
2.0 Example System Architecture
    2.1 Collector
        2.1.1 Fact Data Objects
        2.1.2 Collector Types
        2.1.3 Collection Criteria
        2.1.4 Collector Scheduling
    2.2 Validator
        2.2.1 Example Validators
        2.2.2 Validator Scheduling
    2.3 Notifier
    2.4 Dashboard
3.0 Example Process
4.0 Implementation Mechanisms—Hardware Overview
5.0 Implementation Mechanisms—Software Overview
6.0 Other Aspects of Disclosure

1.0 General Overview

Techniques for monitoring pipelines in computer systems are described. In one embodiment, a collector is programmed or configured for retrieving an event data object and a current status data object from a pipeline subsystems. An event data object is data related to historical events that occurred for one or more subsystems in the pipeline. A current status data object is data that describes the current condition of the one or more subsystems in the pipeline. The collector passes the event data object and the current status data object to one or more validators that are programmed or configured for validating the event data object and the current status data object, based on business logic, to ensure they satisfy one or more validation criteria. If either the event data object or the current status data object is not valid, a notification can be generated, such as an email, text message, or instant message, to notify an interested party about potential issues with the pipeline. In one embodiment, a dashboard displays information related to event data objects, current status data objects, validation results, and/or notifications. By combining the event data and the current status data, the present system provides data that has been previously unavailable, providing a better computer-implemented monitoring solution regarding the status of the data pipeline and its subsystems by integrating different types of data together. Furthermore, the current system can be quickly deployed, as new business logic for the collectors and validators can be created via customized script, configuration files, or programming languages, as needed.

2.0 Example System Architecture

Figure 1:
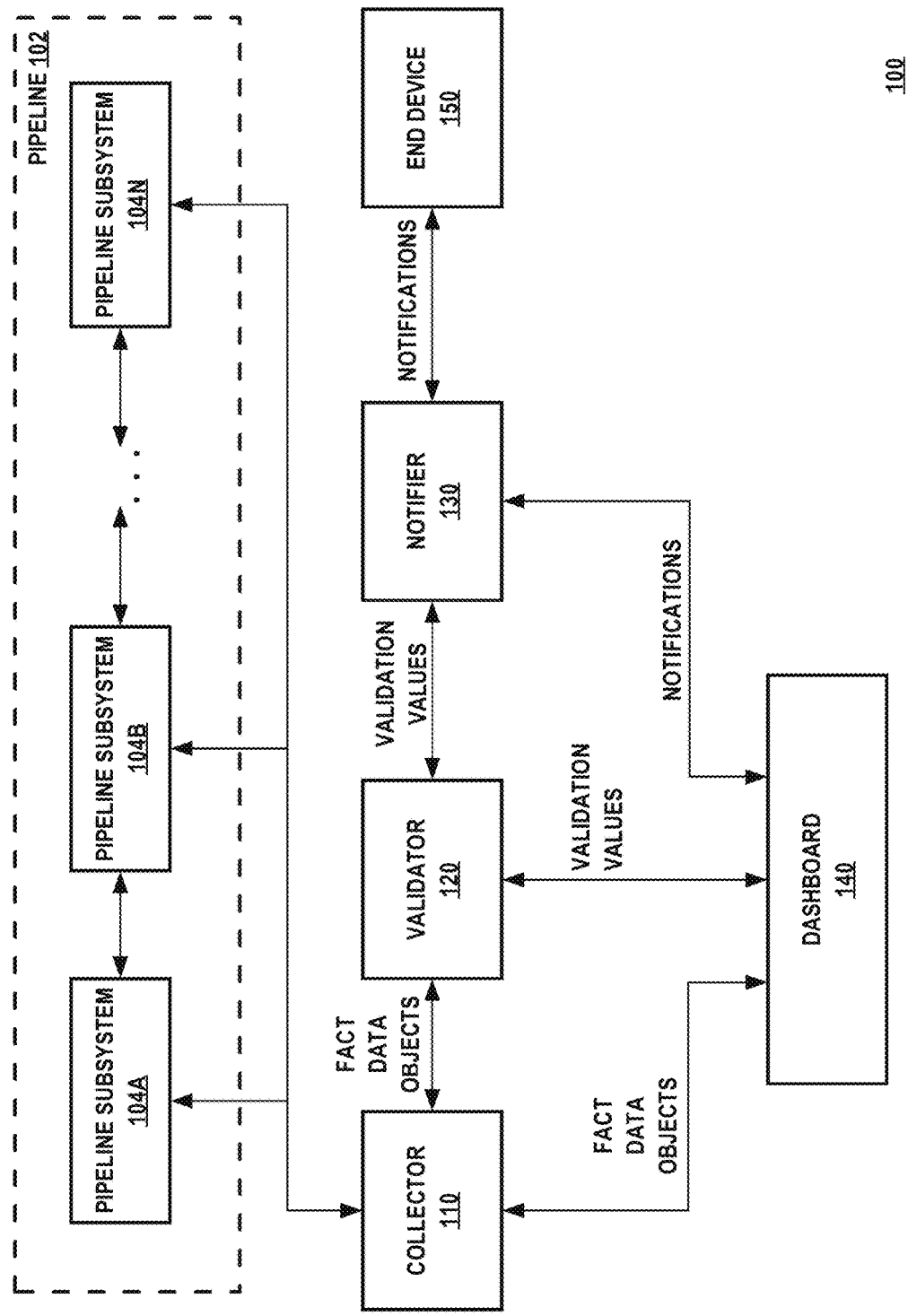
FIG. 1 is a block diagram of an example pipeline monitoring system.

FIG. 1 illustrates an example pipeline monitoring system in which the techniques described herein may be practiced, according to some embodiments. In the example of FIG. 1, a pipeline monitoring system 100 is a system for monitoring a data pipeline. The various components of pipeline monitoring system 100 are implemented, at least partially, by hardware at one or more computing devices, such as one or more hardware processors executing stored program instructions stored in one or more memories for performing the functions that are described herein. In other words, all functions described herein are intended to indicate operations that are performed using programming a special-purpose computer or general-purpose computer, in various embodiments. Pipeline monitoring system 100 illustrates only one of many possible arrangements of components configured to executing the programming described herein. Other arrangements may include fewer or different components, and the division of work between the components may vary depending on the arrangement.

Pipeline monitoring system 100 is programmed or configured to efficiently monitor the health and status of one or more pipelines 102. A pipeline may be defined as a series of pipeline subsystems that are coupled together to perform data processing and/or analysis. For example, pipeline 102 is a series of pipeline subsystems 104A through 104N. A pipeline subsystem may be defined as any process, system, data source, application, hardware, or network infrastructure involved in data processing. For example, a pipeline subsystem may be a software process or job process, an application server, a filesystem, a database, server hardware, or any other similar component involved in processing data in the data pipeline. Although the pipeline subsystems 104A through 104N are depicted as configured serially in pipeline 102, in another embodiment, they may be configured differently. In one embodiment, data may be passed between one or more of pipeline subsystems 104A through 104N. In one embodiment, a pipeline subsystem may modify data that it receives by applying business logic operations to the data before passing the data along to another pipeline subsystem in a pipeline 102. In one embodiment, data that is passed along the pipeline 102 may be stored. For example, in one embodiment, the last pipeline subsystem 104N of a pipeline is a data store, such as a database or a filesystem.

One or more data pipeline subsystems 104A through 104N may be coupled to collector 110. Although depicted as a single collector 110 in pipeline monitoring system 100, in another embodiment, multiple collectors may be included, wherein each collector may be responsible for a subset of the data pipeline subsystems 104A through 104N. A collector may be defined as a process or system that collects one or more fact data objects from one or more of pipeline subsystems.

A fact data object may be defined as a data object that represents information gathered regarding a pipeline subsystem. A fact data object may be an event data object or a current status data object. An event data object may be defined as a data object that indicates the historical status of one or more pipeline subsystems. For example, an event data object may include event statuses as determined by analyzing event logs, system logs, debugging logs, or analyzing the status of job processes. A current status data object may be defined as a data object that indicates a characteristic regarding the current status of one or more pipeline subsystems. For example, current status data objects may include data objects regarding current system disk space, bandwidth availability, memory usage, processing power, or other computing resources. Likewise, a current status data object may include data objects about the current health of data flow through the pipeline, such as the volume of data being passed through a pipeline subsystem, or the speed with which data passes through a pipeline subsystem.

Collector 110 may be coupled to validator 120. Although depicted as a single validator 120 in pipeline monitoring system 100, in another embodiment, multiple validators may be included. A validator may be defined as a process that is programmed or configured to apply one or more validation criteria to one or more fact data objects in order to determine a validation value that represents whether the pipeline is in a healthy state.

Validator 120 may be coupled to notifier 130. Although depicted as a single notifier 130 in pipeline monitoring system 100, in another embodiment, multiple notifiers may be included. A notifier may be defined as a process programmed or configured for sending notifications regarding one or more validation values.

Notifier 130 may be coupled to one or more end devices 150. An end device 150 may be any computing device, including, but not limited to, a portable computing device, a server computing device, a desktop computing device, etc. Notifier 130 may send notifications to end device 150.

One or more of collector 110, validator 120, and/or notifier 130 may be coupled to dashboard 140. A dashboard may be defined as a user interface that allows a user to access and/or view the results of one or more collectors, validators, and/or notifiers in a pipeline monitoring system.

In one embodiment, collector 110, validator 120, notifier 130, and dashboard 140 may be distributed across multiple servers to provide for improved load balancing and stability, thereby reducing the likelihood that a single point of failure amongst one of these components affects the entire data pipeline monitoring system 100.

2.1 Collector

A collector is a process or system that is programmed or configured to collect one or more fact data objects from one or more pipeline subsystems. A fact data object is a data object that represents information regarding the status of a pipeline subsystem. A collector may collect fact data objects from pipeline subsystems either by requesting the underlying fact data object from the pipeline subsystems, or by having the pipeline subsystems push the underlying fact data object to the collector.

2.1.1 Fact Data Objects

A collector can collect any type of information related to a pipeline subsystem and the data that is processed by the pipeline subsystem to be represented as a fact data object. A fact data object may be an event data object and/or a current status data object.

An event data object represents an event that took place within one or more pipeline subsystems. For example, in one embodiment, an event data object may represent the historical status of one or more pipeline subsystems. In another embodiment, a pipeline subsystem maintains an event log, system log, or debugging log, that represents the historical event statuses that have affected the pipeline subsystem. The event log, system log, or debugging log could thus be a source of one or more event data objects. In another embodiment, an event data object may include event statuses as determined by analyzing the status of job processes that have been run. In another embodiment, an event data object may include job run durations. In another embodiment, an event data object may include the names and/or metadata of files that have been processed. Historical data may also include data regarding the volume of data received by a pipeline subsystem, sent by a pipeline subsystem, or processed by the pipeline subsystem over a period of time.

A current status data object may be defined as a data object that indicates the current status or performance of one or more pipeline subsystems. For example, current status data objects may include data objects regarding current pipeline subsystem resources, such as current system disk space, current data volumes, information about data currently failing data quality rules, information regarding currently running jobs, bandwidth, memory, processing power, or other computing resources, etc.

Collectors can collect varied types of fact data objects depending on the type of pipeline subsystem that is providing the fact data object. Examples of fact data objects may include information related to the amount of data being ingested and transmitted by the pipeline subsystem, such as the volume of data (e.g. number of rows in a table, aggregate size of data, etc.) received by the pipeline subsystem during a period of time, the success or failure of a job process, the total number of files and/or data objects received by the pipeline subsystem during a period of time, the amount of data transmitted by the pipeline subsystem, the total number of files and/or data objects sent by the pipeline subsystem during a period of time, a collection of message IDs for messages received and/or sent by the pipeline subsystem. For example, in one embodiment, a fact data object may represent a classification as to whether a data volume is "successful" or "failed", wherein the classification is determined based on whether the data volume includes files and/or data objects that match an expected format and/or satisfy a data quality rule. Fact data objects may include information related to various timestamp-related information such as timestamps for the last known transaction, last modified file, or last created file for a pipeline subsystem. Fact data objects may include information related to warning and exceptions, such as exceptions, errors, or warning messages generated by the pipeline subsystem. Fact data objects may include information related to the amount of computing resources being consumed by the pipeline subsystem, such as random access memory (RAM), computer processing unit (CPU) usage, disk space, cache-space, bandwidth usage, etc. Fact data objects may include information extracted from data at the pipeline subsystem, such as through a database query or regular expression. Fact data objects may include information related to the existence of particular files and/or directories at a pipeline subsystem. Fact data objects may include information related to historical event statuses for a pipeline subsystem obtained from log files, including event logs, system logs, or debugging logs.

In one embodiment, a fact data object that is collected by collector 110 may be stored in a data storage system. In one embodiment, collector 110 may transmit one or more fact data objects to validator 120 in order to validate the fact data object. In one embodiment, collector 110 may transmit one or more fact data objects to dashboard 140 for display.

2.1.2 Collector Types

In an embodiment, a collector can be implemented as a specific type of collector based on the type of pipeline subsystem that is being accessed by the collector. For example, in one embodiment, a collector may be implemented as a customized plugin and/or script for collecting one or more fact data objects from one or more of pipeline subsystems. The availability of a specific type of collector allows for customized logic and handling for fact data object collection. For example, in an embodiment, a filesystem collector is a type of collector that is able to collect a fact data object from one or more directories and/or one or more files in a filesystem where the filesystem is a type of pipeline subsystem. A filesystem collector may collect one or more fact data objects from a filesystem that may include the absolute path of a file or directory, the size of a file or directory, the creation timestamp of a file or directory, the last modified timestamp of a file or directory, the permission setting of a file or directory, the existence of a file or directory, or other characteristics regarding a file or directory. In one embodiment, a filesystem collector may collect a fact data object from a Hadoop distributed file system (HDFS), or another distributed filesystem.

In an embodiment, an application collector is a type of collector that is programmed or configured to collect a fact data object from a pipeline subsystem that includes a software application or software system. For example, in one embodiment, an application collector may collect a fact data object from one or more job orchestration applications. A job orchestration application is an application that may be used to create, configure, monitor, and/or schedule jobs for running on a computer system. In one embodiment, an application collector may collect a fact data object from a pipeline subsystem via an application programming interface (API). For example, pipeline subsystem 104 may have an exposed API. Collector 110 can thus use the API of the pipeline subsystem 104 to request fact data objects from the pipeline subsystem 104. The pipeline subsystem 104, in response to the request, will send a response message containing one or more fact data objects to the collector 110.

In an embodiment, a database collector is a type of collector that is programmed or configured to collect a fact data object from a pipeline subsystem that includes access to a database, dataset, or data table. For example, in one embodiment, a pipeline subsystem may include a database. The database may be a relational database or a non-relational database. In one embodiment, a database collector can be configured to apply a query language, such as a structured query language (SQL), to the database of a pipeline subsystem in order to collect one or more fact data objects from the database. Thus, a database collector is able to collect any sort of fact data object from a database that could be specified via a database query. For example, the query could request a count of the number of rows that match a query criteria, a mathematical operation performed on one or more sets of data in the database, the number of database transactions committed by a database over a period of time, or a request for certain subsets of data from a database. In one embodiment, a database collector is able to collect a fact data object from a pipeline subsystem via a Java Database Connectivity (JDBC) connection.

In an embodiment, a hardware collector is a type of collector that is programmed or configured to collect a fact data object from a pipeline subsystem that includes hardware or network infrastructure. For example, hardware or network infrastructure may include server hardware, routers, modems, etc. A hardware collector may collect fact data objects regarding the hardware or network infrastructure, such as uptime, available bandwidth, error codes, etc.

2.1.3 Collection Criteria

In one embodiment, a collector may include collection criteria that specifies instructions for how the collector can collect fact data objects from a pipeline subsystem. Collection criteria may be specified via any known programming language, query language, scripting language, configuration file, regular expressions, or markup language. For example, a database query can be used to customize collection criteria for a collector to enable the collector to collect fact data objects based on the query.

For example, a collector can be configured using one or more regular expressions that specify characteristics or details regarding the fact data objects that the collector will collect. In the case of a filesystem collector, the collector could be configured using a regular expression to indicate that the collector will only collect fact data objects regarding files or directories that match the regular expression. Thus, a regular expression could be used to customize the functioning of a collector.

2.1.4 Collector Scheduling

In one embodiment, collector 110 is programmed or configured to collect fact data objects from a pipeline subsystem in accordance with a schedule. For example, a cron schedule can specify the timing of when a collector 110 should collect fact data objects from one or more pipeline subsystems. The schedule may be pre-configured and may vary based on pipeline subsystem.

2.2 Validator

A validator is a process that is programmed or configured to apply one or more validation criteria to one or more fact data objects received from a collector in order to determine a validation value that represents a characteristic of the health state of the pipeline. Validation criteria may include any programming instruction, scripts, query, configuration file, and/or business logic that validates a fact data object. For example, in one embodiment, validation criteria may be configured based on a script written in the Groovy scripting language. In another embodiment, a validator may be configured using a markup language, such as extensible markup language (XML), or a non-markup language, such as "YAML Ain't Markup Language" (YAML). Validation criteria may include one or more threshold settings or expected values that can be used for comparison when a validator validates a fact data object. The breadth of options for specifying validation criteria thus makes a highly customizable deployment that allows validators to validate any sort of fact data object using customized business logic for the particular pipeline subsystems.

A validation value may be defined as a data object that represents a characteristic of the health state of the pipeline based on one or more validation criteria applied to one or more fact data objects. For example, in one embodiment, validation value may include statuses such as "PASS", "WARNING", or "CRITICAL" to denote whether the fact data object satisfied the validation criteria. In another embodiment, a validation value could be a Boolean or integer value to indicate whether the fact data object satisfied the validation criteria. In another embodiment, a validation value may include a message that describes the health of the pipeline subsystem based on the validation criteria that was applied to the one or more fact data objections. In one embodiment, a validation value may also include an identifier that identifies the pipeline subsystem and/or fact data object that it relates to.

In one embodiment, a validation value that is generated by validator 120 may be stored in a data storage system. In one embodiment, validator 120 may transmit one or more validation values to notifier 130 in order to generate notifications. In one embodiment, validator 120 may transmit one or more validation values to dashboard 140 for display.

2.2.1 Example Validators

Validator 120 is programmed or configured to validate the status of one or more pipeline subsystems. Although depicted as a single validator 120, the functionality may be distributed across multiple validators 120 instead. For example, separate validators may be implemented for different collectors and/or different pipeline subsystems.

In one embodiment, validator 120 can include validation criteria to check the current transaction status of a database, database table, dataset, software system, job, script, or any other pipeline subsystem. Validator 120 can thus generate a validation value that indicates whether a transaction at one or more pipeline subsystems was committed or not.

In another embodiment, validator 120 can be used to validate the number of rows in a table. For example, validator 120 can use validation criteria that includes a threshold expected number of rows for a table and compare it to a fact data object that specifies the actual number of rows observed for a table. Validator 120 can thus generate a validation value that indicates whether a table satisfied the threshold expected number of rows.

In another embodiment, validator 120 can be used to validate that all rows have succeeded for a JDBC table. For example, validator 120 can use validation criteria that validates that all rows for a JDBC table have succeeded. For example, in one embodiment, a table contains a log of job processing results, including the success and/or failure of the job processes. In another embodiment, a validator may apply data validation rules, via a SQL statement to determine that the resulting rows of the database satisfy the SQL statement. Validator 120 can thus generate a validation value that indicates whether a JDBC table only includes rows that succeeded.

In another embodiment, validator 120 can be used to validate that a given pipeline subsystem has sufficient computing resources. For example, validator 120 can use validation criteria that validates that a pipeline subsystem has sufficient computing resources, such as available CPU, disk space, memory, etc. In one embodiment, the validation criteria may include a threshold or expected value for the computing resources. Validator 120 can thus generate a validation value that indicates whether a pipeline subsystem has sufficient computing resources.

In another embodiment, validator 120 can be used to validate that a given pipeline subsystem is receiving, processing, and/or sending an expected volume of data. For example, validator 120 can use validation criteria that validates that a pipeline subsystem has received, processed, or sent an expected volume of data for a given time period. In one embodiment, the expected volume of data may be configured via a threshold value parameter. In another embodiment, the expected volume of data may be configured based on historical trends for the given pipeline subsystem. For example, validator 120 can use validation criteria to determine that an expected volume of data to be received by the particular pipeline subsystem is 100 MB of data per hour during business hours, based on historical trends for the pipeline subsystem. Validator 120 can then use this expected volume of data to validate whether the pipeline subsystem is functioning as expected. Validator 120 can thus generate a validation value that indicates whether a pipeline subsystem is receiving, sending, and/or processing an expected volume of data. In one embodiment, the expected volume of data may be determined using statistical techniques. For example, the expected volume of data may be determined by analyzing the median value of the amount of data received by the given pipeline subsystem over a period of time, such as a month. The expected volume of data may then be determined by applying a number of standards of deviation around the mean or median value, in order to determine a range of expected volume of data. For example, in the past month, the median daily volume of data may be determined to be 100 MB, with a standard of deviation of 10 MB. The validator 120 may be configured to apply two standards of deviation around the median as an expected volume of data. Thus, the range of expected volume of data would be 80 MB-120 MB. Validator 120 can thus generate a validation value that indicates if the observed volume of data falls within the range of expected volume of data.

In another embodiment, validator 120 can be used to validate that a given pipeline subsystem is ingesting data at an expected frequency. The validator 120 can compare the observed data ingestion frequency with an expected data ingestion frequency. Validator 120 can thus generate a validation value that indicates if the observed data ingestion frequency satisfies the expected data ingestion frequency.

In another embodiment, validator 120 can be used to validate that one or more jobs have an expected job duration. The one or more jobs may be currently running jobs or previously running jobs. The expected job duration may be a threshold setting, an expected range of job durations, or may be a value that is set based on historical data regarding prior job runs. Validator 120 can thus generate a validation value that indicates if the observed job duration satisfies an expected job duration.

In another embodiment, validator 120 can be used to validate that one or more pipeline subsystems have not exceeded a failure count threshold. A failure count represents the number of observed failures of one or more pipeline subsystems and can be customized based on the particular pipeline subsystem. For example, a failure count in a database may represent the number of database rows that fail data quality checks, whereas a failure count in an application may represent the number of errors received by the application or the number of exceptions thrown. The failure count threshold can be customized based on the particular pipeline subsystem. Validator 120 can thus generate a validation value that indicates if the failure count exceeds the failure count threshold of the one or more pipeline subsystems.

In one embodiment, the validation criteria of validator 120 can be modified and tuned based on machine learning techniques. For example, validator 120 may observe expected data traffic patterns for a particular pipeline subsystem over time, and may tune its validation criteria, using machine learning techniques and historical fact data objects, to determine new threshold settings. Thus, validator 120 can adapt and adjust to the performance of a pipeline subsystem over time.

In one embodiment, validator 120 can be programmed or configured to perform deduplication of validation values. Validator 120 can determine whether a new validation value generated by the validator 120 is the same as a prior validation value, by comparing the prior validation value to the new validation value. If the new validation value is the same as the prior validation value, validator 120 can either decline to report the validation value to other components of the pipeline monitoring system 100, or, alternatively, can merely update the metadata of the prior validation value with new metadata, such as an updated timestamp or a count of the number of times that the prior validation value has occurred. By reduplicating validation values, the validator 120 can simplify the transmission of redundant validation values. Such redundant validation values may continually occur until the underlying issue that caused the validation value is remedied.

In one embodiment, validator 120 can be programmed or configured to automatically resolve an issue identified by a validation value if the validation value has changed over time. For example, validator 120 can initially determine a first validation value that indicates that a pipeline subsystem experienced a failure of some sort. Validator 120 can later determine a second validation value that indicates that the pipeline subsystem has experienced a success of some sort, thereby implying that prior failure has been resolved. In one embodiment, validator 120 can send a notification to notifiers 130 and/or dashboard 140 that the first validation value indicating a failure has been resolved. By automatically detecting and resolving validation values that have changed over time, the validator 120 can reduce the need for manual inspection and intervention for prior failures in the pipeline that have since been corrected.

2.2.2 Validator Scheduling

In one embodiment, validator 120 may process fact data objects immediately as soon it receives a fact data object from collector 110. In another embodiment, validator 120 may process fact data objects based on a schedule. For example, a cron schedule can specify the timing of when a validator 120 should process one or more fact data objects to generate validation results. The schedule may be preconfigured and may vary based on pipeline subsystem, validator, or the type of fact data object received.

2.3 Notifier

A notifier is programmed or configured to receive one or more validation value and sends one or more notifications based on the one or more validation values to one or more end devices. A notification can be any sort of message or alert that sends data to an end device. Examples of notifications include instant messages, emails, pop-up notifications, social media notifications, beeper messages, telephone calls, voice mail messages, or any other data packet, data object, or message. An end device of a notification can be any computing device and/or server system. For example, an end device may include a smartphone, tablet, laptop, desktop, wearable device, auditing report system, email server, instant message server, logging server, a database, or any other computing device or software system. In one embodiment, a dashboard 140 may be a type of end device.

Notifier 130 generates one or more notifications based on a validation value received from validator 120. A notification may include information related to the recipient end device, such as the URL, address, or other location of the end device. A notification may include the validation value itself, or may include information related to the validation value, such as a descriptive message regarding the validation value.

In one embodiment, a notifier 130 may configure the specific recipient end devices that will receive a notification based on the content of the validation value. For example, notifier 130 may store pre-configured data related to what particular end device(s) 150 should receive a notification based on the contents of a validation value. In one embodiment, notifier 130 will identify one or more end devices 150 to notify based on validation value received. For example, notifier 130 may determine that, based on a validation value related to pipeline subsystem 104A, a first end device should be notified, but, based on a validation value related to a pipeline subsystem 104N, a second end device should be notified instead.

In one embodiment, a notifier 130 may customize the format of the notification based on the contents of the validation value. The information related to the customization of the format of the notification may be pre-configured for the notifier 150. For example, in one embodiment, when notifier 130 receives a validation value that indicates a critical error for a pipeline subsystem, notifier 130 will generate a voice mail message notification, as such errors are highly important. On the other hand, if notifier 130 receives a validation value that identifies a low priority warning for a pipeline subsystem, notifier 130 will generate an email notification, as such warnings are less important and thus do not warrant a voice mail message. Thus, notifier 130 is able to customize the handling of different types of validation value based on the content of the validation value, such as the severity, the type of validation value, or the pipeline subsystem associated with the validation value.

In one embodiment, notifier 130 may repeatedly send notifications regarding a particular validation value until the underlying issue that caused the validation value is resolved in the pipeline subsystem. The resolution may occur by a user manually acknowledging the validation value as being fixed, or by waiting until the underlying fact data objects that are collected from the pipeline subsystem yield a more favorable validation value. For example, notifier 130 may repeatedly send such notifications based on a schedule, such as every 15 minutes, that a particular pipeline subsystem is experiencing a critical error. This will ensure that interested parties will continue to receive notifications and reminders, via notifications, until the underlying issue with the particular pipeline subsystem is resolved.

In one embodiment, notifier 130 may include one or more parameters to specify the maximum age of a validation value to include in a notification. For example, a maximum age may indicate that validation values that are less than one hour old should be sent, and any validation values older than one hour will not generate new notifications. Thus, notifier 130 will not send notifications regarding stale validations results that are older than one hour old. This customization allows the system to limit outdated or repetitive notifications from being resent.

In one embodiment, the content of the notification can be customized based on the validation value. For example, in the case of an email notification, the subject line, body, recipient list, etc., can all be customized based on the validation value to provide a receiving user computer meaningful information about the cause of the validation value.

In one embodiment, a notification that is generated by notifier 130 may be stored in a data storage system. In one embodiment, notifier 130 may transmit one or more notification values to dashboard 140 for display.

2.4 Dashboard

Figure 2:
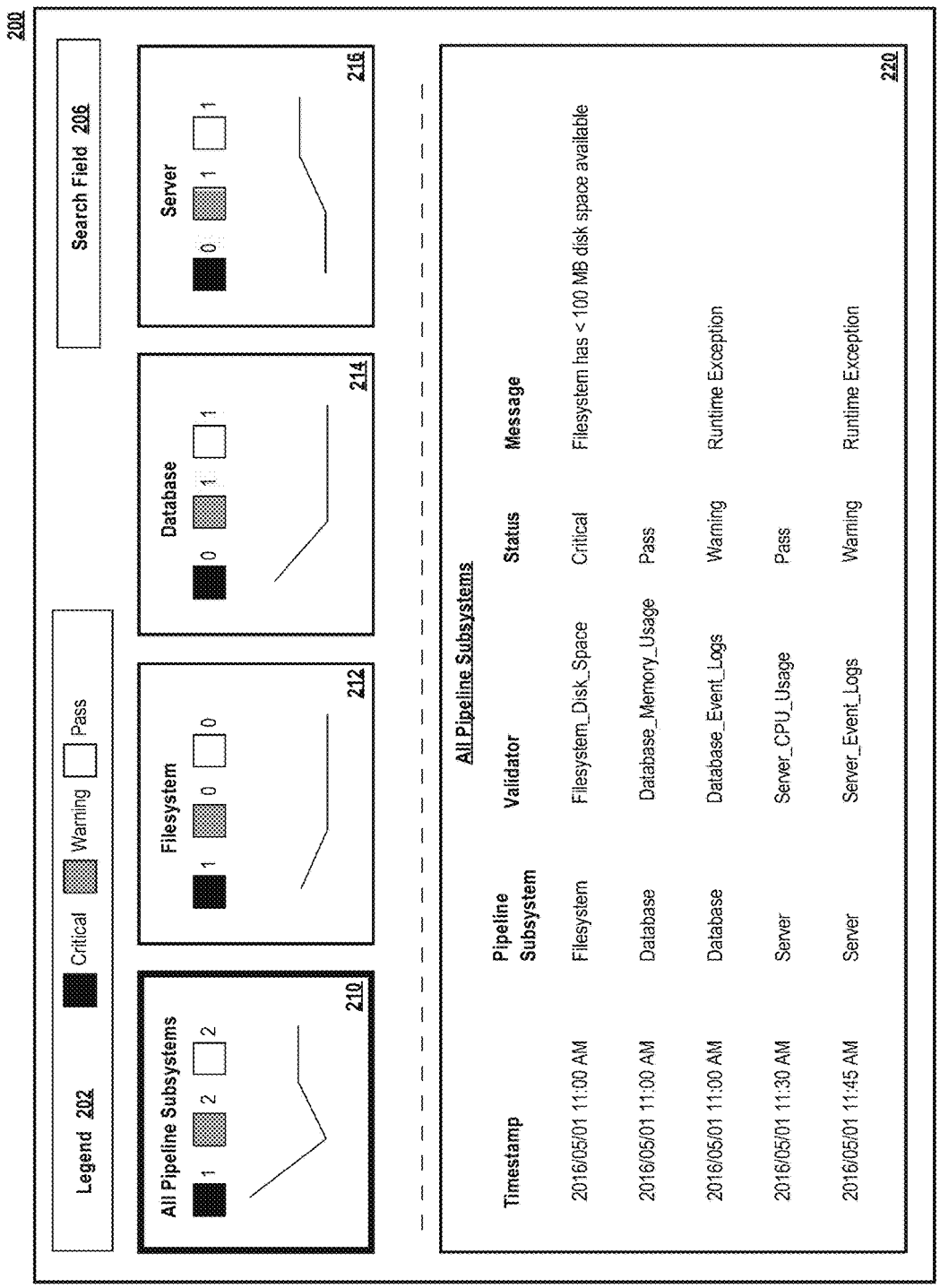
FIG. 2 is a diagram of an example user interface for a dashboard in a pipeline monitoring system.

FIG. 2 illustrates an example user interface 200 for a dashboard 140. In one embodiment, user interface 200 may be generated based on fact data objects received from collector 110, validation values received from validator 120, and/or notifications received from notifier 130. Thus, dashboard 140 may provide a comprehensive aggregate overview of the health of the pipeline 102.

In one embodiment, user interface 200 may include legend 202. Legend 202 identifies visual characteristics for various statuses for a pipeline subsystem. A status may be defined as a summary of a validation value that indicates a health of a pipeline subsystem. A visual characteristic may be any visual display that may be used to uniquely identify a status, such as shading, color-coding, shape, transparency, border, etc. Thus, in legend 202, statuses for "Critical", "Warning", and "Pass" may indicate validation values of pipeline subsystems that are displayed based on a visual characteristic that includes shading of a box.

User interface 200 may include one or more summary cards 210, 212, 214, 216. A summary card is a visual summary of the health of one or more pipeline subsystems. For example, summary card 210 displays a summary of "All Pipeline Subsystems", whereas summary card 212 displays a summary of the "Filesystem" pipeline subsystem, summary card 214 displays a summary of the "Database" pipeline subsystem, and summary card 216 displays a summary of the "Server" pipeline subsystem. In one embodiment, a summary card may display a high level summary of the validation values for the particular pipeline subsystem(s). Thus, summary card 210 indicates that "All Pipeline Subsystems" includes one critical validation value, two warning validation values, and two pass validation values. On the other hand, summary card 212 indicates that the "Filesystem" pipeline subsystem has one critical validation value, and zero warning or pass validation values. A summary card may additionally include a graph that that illustrates the historical timeline of validation values for the one or more pipeline subsystems. For example, the graph may be a histogram or line graph of past validation results for the particular pipeline subsystems associated with the summary card. In one embodiment, the graph may be limited to a subset of validation values or statuses. For example, the graph may only display critical status validation values. The summary cards thus provide a quick aggregate overview of the health of pipeline, by allowing a user computer to quickly view what kinds of issues may be affecting pipeline subsystems. This enables a user computer to quickly determine which pipeline subsystems may need attention. A user computer can be defined as any computing device that provides an interface for monitoring a pipeline, and may include a laptop, desktop, smartphone, tablet, wearable device, or any other similar computing device.

In one embodiment, user interface 200 may include a search field 206 that allows a user to quickly search for summary cards that match a particular criteria. In another embodiment, user interface 200 may include settings (not depicted) that allow a user computer to customize their view of the summary cards. For example, settings may allow a user computer to filter out particular pipeline subsystems, or filter out certain fact data objects, validation values, notifications, or statuses from the summary card. For example, a setting may allow a user computer to filter out notifications that do not fall within a particular time period. This customization allows a user computer to quickly and easily view the information that is most relevant for monitoring the health of the pipeline.

User interface 200 may include table 220. Table 220 provides a detailed view of the fact data objects, validation values, and/or notifications related to one or more pipeline subsystems. In one embodiment, the content of table 220 may be synchronized with the summary card that is selected by a user computer. Thus, in user interface 200, a user computer has selected summary card 210, as denoted by the bolded border for the summary card 210. Thus, table 220 displays content that is associated with "All Pipeline Subsystems", including fact data objects, validation values, and/or notifications related to all pipeline subsystems.

Table 220 may include a timestamp field that displays the time of the associated fact data objects, validation value and/or notification of the row entry. Table 220 may include a Pipeline Subsystem field that identifies one or more pipeline subsystems that are associated with the row entry. Table 220 may include a validator field that displays a description of the validator responsible for the row entry. Although not depicted in user interface 200, table 220 may include similar fields for collector and/or notifier. Table 220 may include a status field that indicates a validation value. Table 220 may include a message field that may display additional data regarding the displayed fact data object, validation value, and/or notification. For example, in user interface 200, table 220 includes a message field that displays message data that was included in a notification related to a given validation value. Thus, the first row of table 220 indicates that the Filesystem pipeline subsystem experienced a Critical validation value at 11:00 AM on May 1, 2016. Specifically, the Filesystem_Disk_Space validator detected that the Filesystem has less than 100 MB of available disk space. Table 220 thus provides a succinct view for a user computer to view the status of a pipeline and its subsystems in order to determine how to quickly correct these issues.

In one embodiment, once a user computer has resolved a particular issue causing a validation value, they may mark it as resolved in table 220. In one embodiment, once a validation value has been marked as resolved in table 220, dashboard 140 may send a request to collector 110, validator 120, and/or notifier 130 to collect and generate new fact data objects, validation values, and notifications for the pipeline subsystem to ensure that the issue has in fact been resolved correctly.

Figure 3:
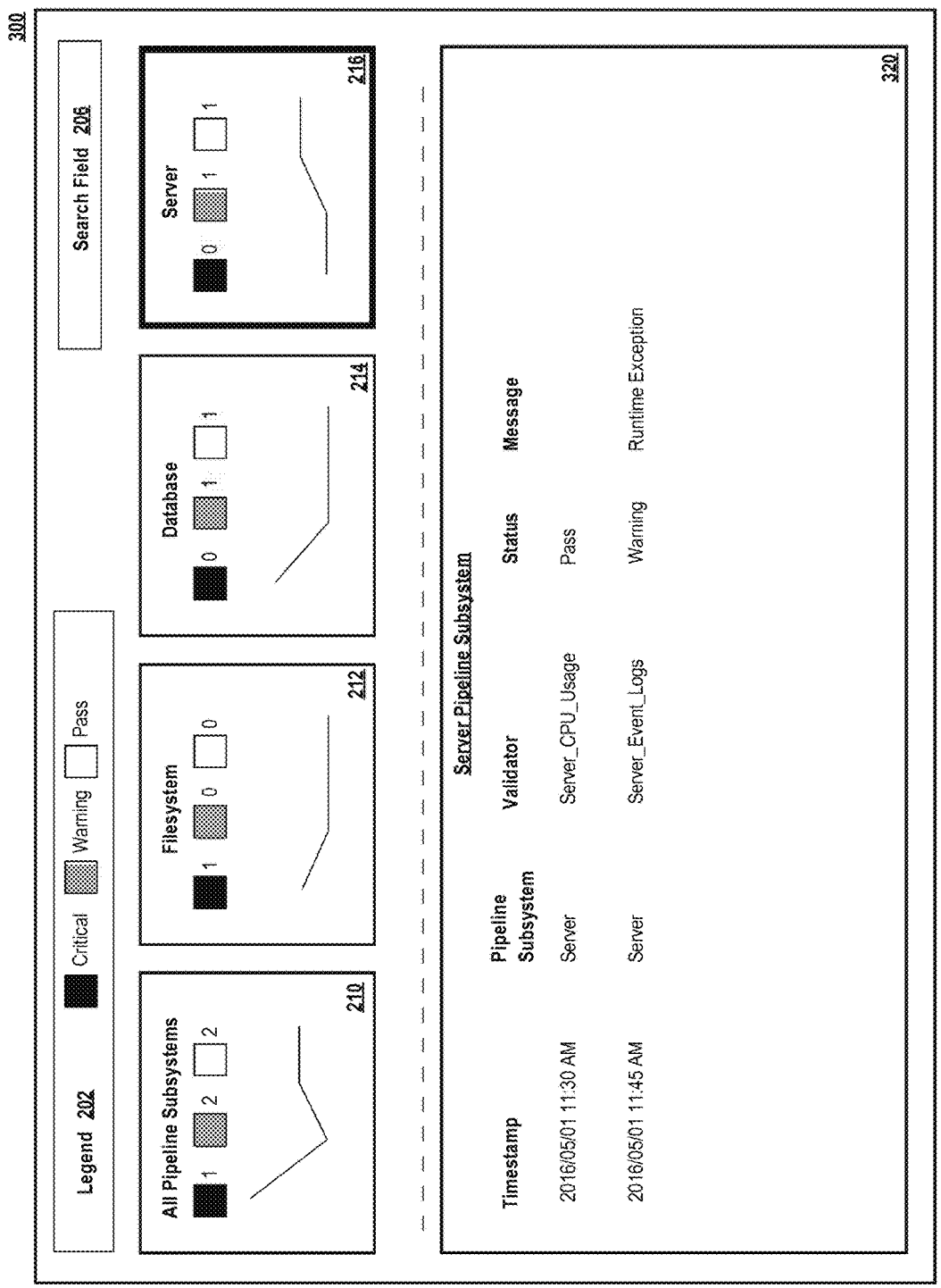
FIG. 3 is a diagram of an example user interface for a dashboard in a pipeline monitoring system.

FIG. 3 illustrates an example user interface 300 for a dashboard 140. User interface 300 is similar to user interface 200 in FIG. 2, however in user interface 300, a user has now selected summary card 216 instead of summary card 210. By selecting summary card 216, table 320 now displays a filtered version of table 220 that only displays row entries related to the particular pipeline subsystem(s) that are associated with summary card 216. Therefore, by selecting a particular summary card, a user computer can drill down to the detailed validation values related to the one or more pipeline subsystem(s) associated with the summary card.

Figure 4:
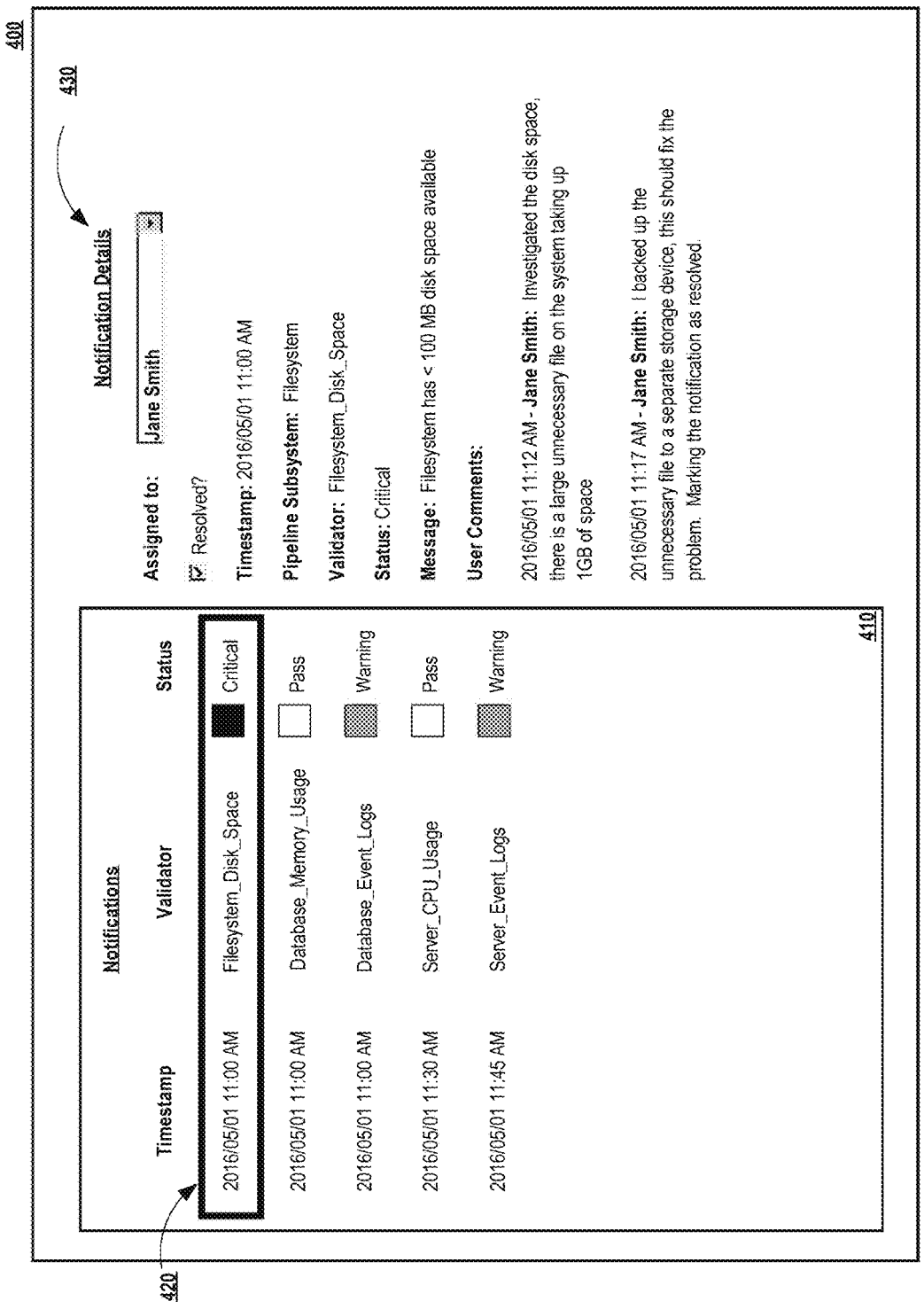
FIG. 4 is a diagram of an example user interface for a dashboard in a pipeline monitoring system.

FIG. 4 illustrates an example user interface 400 for a dashboard 140. User interface 400 may be generated and displayed based on fact data objects, validation values, and/or notifications. User interface 400 includes a notification panel 410. Notification panel 410 includes details about notifications received from notifier 130, such as timestamp, validator, and status. Notification panel 410 may include any information obtained from a notification, or information obtained from an associated fact data object or validation value. In one embodiment, a user computer may select a particular notification in notification panel 410. For example, notification 420 is a selected notification in notification panel 410, as is denoted by the bolded square around the selected notification. When a user computer selects notification 420, corresponding detailed information regarding the selected notification may be displayed to the user computer in notification details 430. Notification details 430 may include any additional information related to the notification or the associated fact data objects and/or validation values. In one embodiment, notification details 430 may include user interface element for assigning a notification to a user computer so that the user computer can resolve the associated issue. Notification details 430 may include an interface element to mark that a notification has been resolved. Notification details 430 may include a comments field to allow user computers to communicate information about the notification and their progress towards resolving it. User interface 400 thus provides a succinct and clear way to communicate information about notifications to user and allow users to interact with notifications and each other.

In another embodiment, a dashboard may be implemented in a calendar-format that shows information of dashboard 140 in a calendar-based format, whereby summary cards are displayed in association with respective calendar days in a calendar. The calendar may be configured to display a time period, such as a weekly period, biweekly period, monthly period, yearly quarter period, yearly period, etc. This allows a user to easily view historical trends for one or more pipeline subsystems over a period of time.

Figure 8:
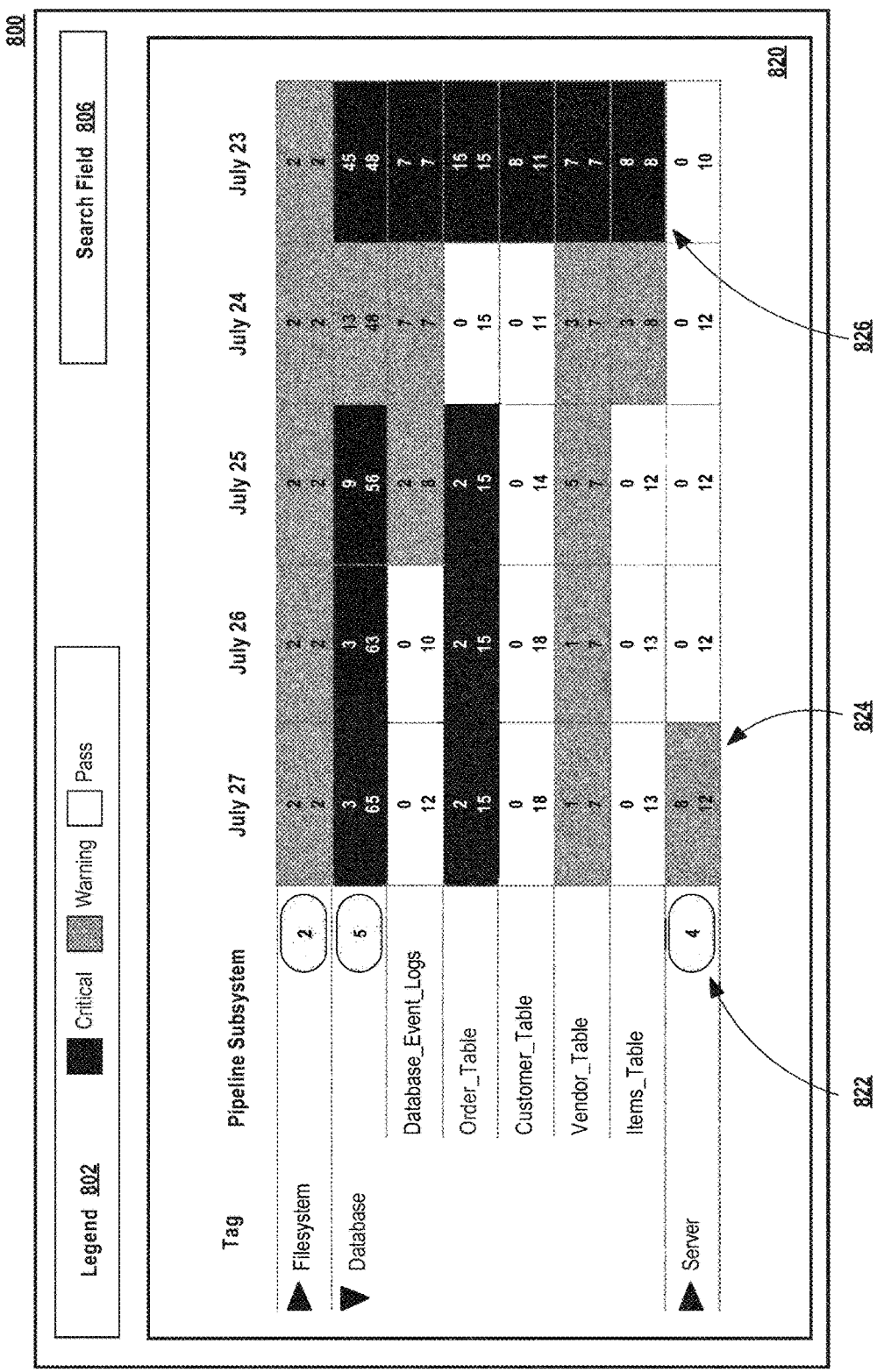
FIG. 8 is a block diagram of an example user interface for a dashboard in a pipeline monitoring system.

For example, FIG. 8 shows an example of a user interface 800 in a calendar-format for a dashboard 140. User interface 800 may be generated and displayed based on fact data objects, validation values, and/or notifications. User interface 800 may include a calendar panel 820 that displays aggregated information regarding fact data objects, validation values, and/or notifications in a calendar-based format. Calendar panel may 820 may include one or more row entries. A particular row entry displays data regarding a particular pipeline subsystem or tag data. In one embodiment, tag data is data that allows for grouping a collection of multiple pipeline subsystems and/or validators for purposes of display in user interface 800. For example, it may be beneficial to create a tag for multiple pipeline subsystems that are interrelated in order to easily monitor the status of those interrelated pipeline subsystems. The tag data may be customized by a user. For example, calendar panel 820 includes different row entries for a "Filesystem" tag, a "Database" tag, and a "Server" tag. In one embodiment, a row entry for a tag may be collapsible and expandable to display information regarding pipeline subsystems associated with its tag. For example, in calendar panel 820, row entries for the "Filesystem" and "Server" tags are collapsed, thereby only showing summary information for each tag as a whole. By contrast, the row entry for the "Database" tag is expanded, thereby displaying additional row entries for particular pipeline subsystems associated with the "Database" tag, such as "Database_Event_Logs", "Order_Table", "Customer_Table", "Vendor_Table", and "Items_Table". A row entry for a tag may include a summary indicator 822 that identifies the number of pipeline subsystems associated with the tag. Thus, summary indicator 822 indicates that there are four pipeline subsystems associated with the "Server" tag.

A row entry may include one or more time period summary panels 824. A time period summary panel is a visualization of fact data objects, validation values, and/or notifications related to a row entry for a particular period of time, such as an hour, day, week, etc. In one embodiment, a time period summary panel 824 may include a first numerical indicator that identifies the number of validation values and/or notifications that have failed to satisfy some criteria over the given time period. For example, the first indicator may identify the number of validation values that have not received a "Pass" status for the given row entry. Thus, in time period summary panel 824, the first numerical indicator indicates that eight validation values do not have a "Pass" status for the "Server" tag on July 27. In one embodiment, a time period summary panel 824 may include a second numerical indicator that identifies the total number of validation values and/or notifications received for the particular row entry over the given time period. Thus, in time period summary panel 824, the second numerical indicator indicates that twelve validation values have been received for the "Server" tag on July 27.

In one embodiment, user interface 800 may include legend 802 that identifies visual characteristics for various statuses for a pipeline subsystem. In one embodiment, a time period summary panel may include a visual characteristic that identifies the severity of validation values and/or notifications received for the particular row entry. Such visual characteristics could include color-coding, shading, border size, shapes, icons, or any other visual characteristic that can clearly identify the severity or status of a validation value and/or notification. The use of visual characteristics allows a user interface to provide an efficient heat map of severity of issues encountered by pipeline subsystems in calendar panel 820 that is easy for a user to see and understand. For example, in user interface 800, the time period summary panel 824 is color-coded as a "Warning" status, in order to indicate that the most severe validation value received for the "Server" tag on July 27 is a "Warning". By contrast, the time period summary panel 826 is color-coded to indicate that, on July 23, the "Items_Table" pipeline subsystem experienced a critical validation value.

In one embodiment, user interface 800 may include a search field 806 that allows a user to quickly search for tags, pipeline subsystems, or time period summary panels that match a particular search criteria. In another embodiment, user interface 800 may include settings (not depicted) that allow a user computer to customize their view of the calendar panel 820. For example, settings may allow a user computer to filter out particular pipeline subsystems, or filter out certain fact data objects, validation values, notifications, or statuses from the calendar panel 820.

In one embodiment, dashboard 140 has access to dependency data that indicates what particular downstream pipeline subsystem(s) are dependent on data from one or more upstream pipeline subsystems. In one embodiment, dashboard 140 can automatically generate tag data for fact data objects, validation values, and/or notifications based on this dependency data in order to clearly show the interdependencies of the pipeline subsystems. In one embodiment, this tag data may be visualized in dashboard 140, to allow users to easily see the dependency data and understand what pipeline subsystems are experiencing problems that may affect the health of downstream pipeline subsystems. This allows a user to quickly and efficiently troubleshoot technical issues for the pipeline.

3.0 Example Process

Figure 5:
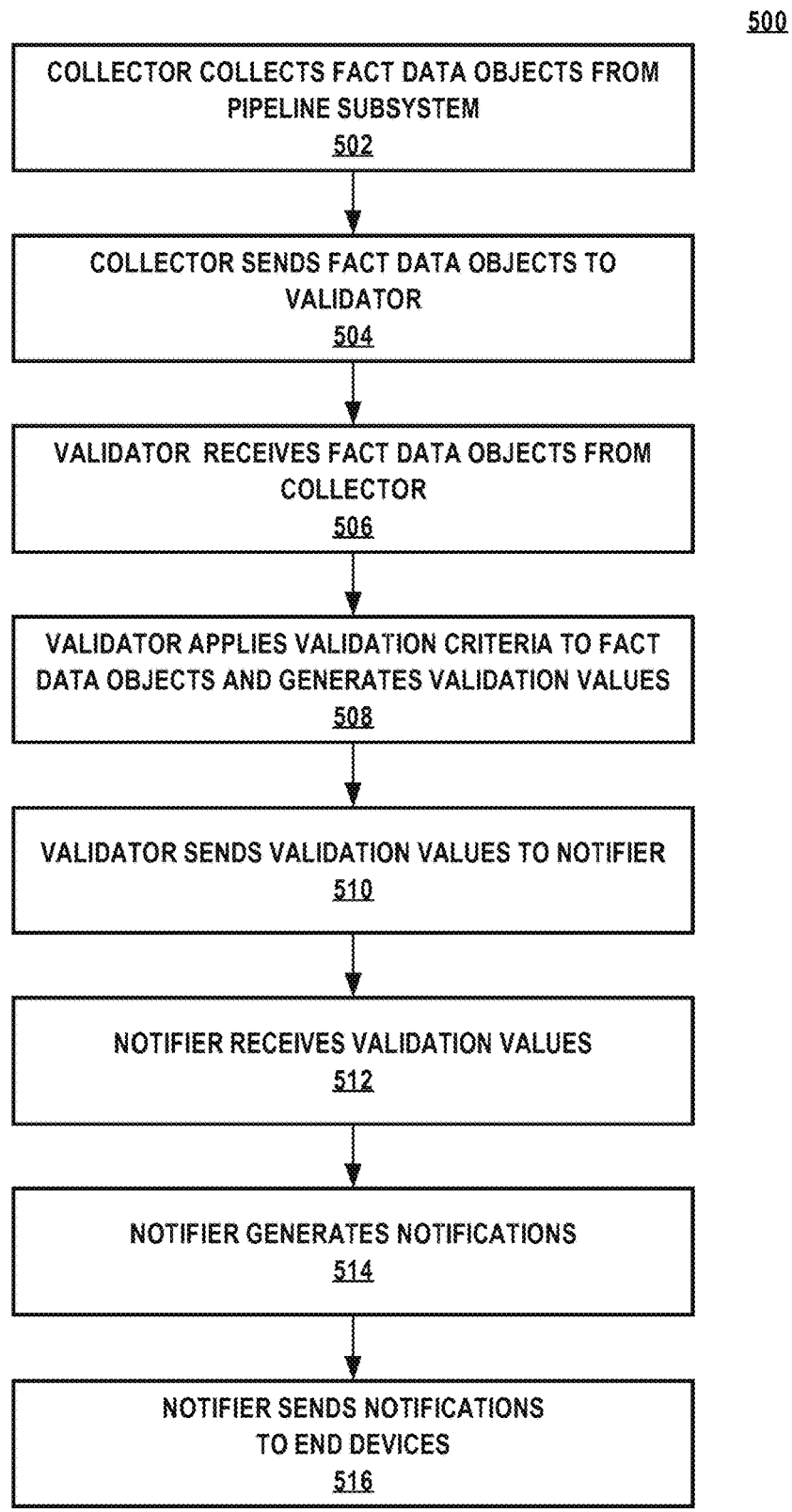
FIG. 5 is a flow diagram of an example process for pipeline monitoring.

FIG. 5 illustrates an example computer-implemented process 500 of monitoring the health status of a data pipeline, as described above with reference to pipeline monitoring system 100. FIG. 5 provides an example algorithm that may be used as a basis for programming computers to perform the techniques that are described herein, using any of a variety of program development environments or source languages such as JAVA, C++, OBJECTIVE-C, C, scripting languages, and the like.

In step 502, collector 110 collects one or more fact data objects from pipeline subsystems 104A through 104N. The fact data objects that are collected may be a combination of event data objects and/or current status data objects. In one embodiment, the fact data objects are collected based on collection criteria specified by collector 110. Each of the fact data objects represents information gathered regarding one or more of the pipeline subsystems 104 through 104N. Once collector 110 has collected the one or more fact data objects, the process 500 may proceed to step 504.

In step 504, collector 110 sends one or more of the fact data objects collected in step 502 to validator 120. In one embodiment, collector 110 may additionally send one or more of the fact data objects collected in step 502 to dashboard 140. In one embodiment, collector 110 may additionally store one or more of the fact data objects collected in step 502 in storage (not depicted). Once collector 110 has sent one or more fact data objects to validator 120, the process 500 may proceed to step 506.

In step 506, validator 120 receives the one or more fact data objects sent by collector 110 in step 504. Once validator 120 receives the one or more fact data objects, the process 500 may proceed to step 508.

In step 508, the validator 120 applies validation criteria to the one or more fact data objects received in step 506. The validation criteria may be preconfigured and may be specified via a scripting or programming language. By applying the validation criteria to the one or more fact data objects, validator 120 generates one or more validation values that represent the validation state(s) of the pipeline subsystems as determined based on the fact data objects collected by collector 110. Once validator 120 has generated the one or more validation values, the process 500 may proceed to step 510.

In step 510, validator 120 sends one or more validation values generated in step 508 to notifier 130. In one embodiment, validator 120 may additionally send one or more validation values generated in step 508 to dashboard 140. In one embodiment, validator 120 may additionally store one or more validation values generated in step 508 in storage (not depicted). Once validator 120 has sent one or more validation values to notifier 130, the process 500 may proceed to step 512.

In step 512, notifier 130 receives one or more validation values sent by validator 120. Once notifier 130 receives one or more validation values, the process 500 may proceed to step 514.

In step 514, notifier 130 generates one or more notifications based on the one or more validation values. Notifications may include messages for transmitting emails, text messages, system messages, toast popups, voice message or any other sort of alert. In one embodiment, the type, format, or content of the notification generated may be dependent on the type of validation value received. For example, a low warning validation value may not generate any notification, a high warning validation value may trigger an email notification to be generated, and an emergency validation value may trigger a voice message notification to be generated. Once notifier 130 has generated one or more notifications, the process 500 may proceed to step 516.

In step 516, notifier 130 sends the one or more notifications generated in step 514 to one or more end devices 150. End devices may include personal computing devices such as laptops, desktops, smartphones, tablets, wearable devices, and other similar devices. End devices may include server systems such as an email server, a reporting server, or some other server system. In one embodiment, and end device may include a cloud-based server. In one embodiment, notifier 130 may additionally send the one or more notifications to dashboard 140. In one embodiment, notifier 130 may additionally store the notifications in data storage (not depicted). Once notifier 130 sends notifications to one or more end devices 150, the process 500 may end.

4.0 Implementation Mechanisms—Hardware Overview

Figure 6:
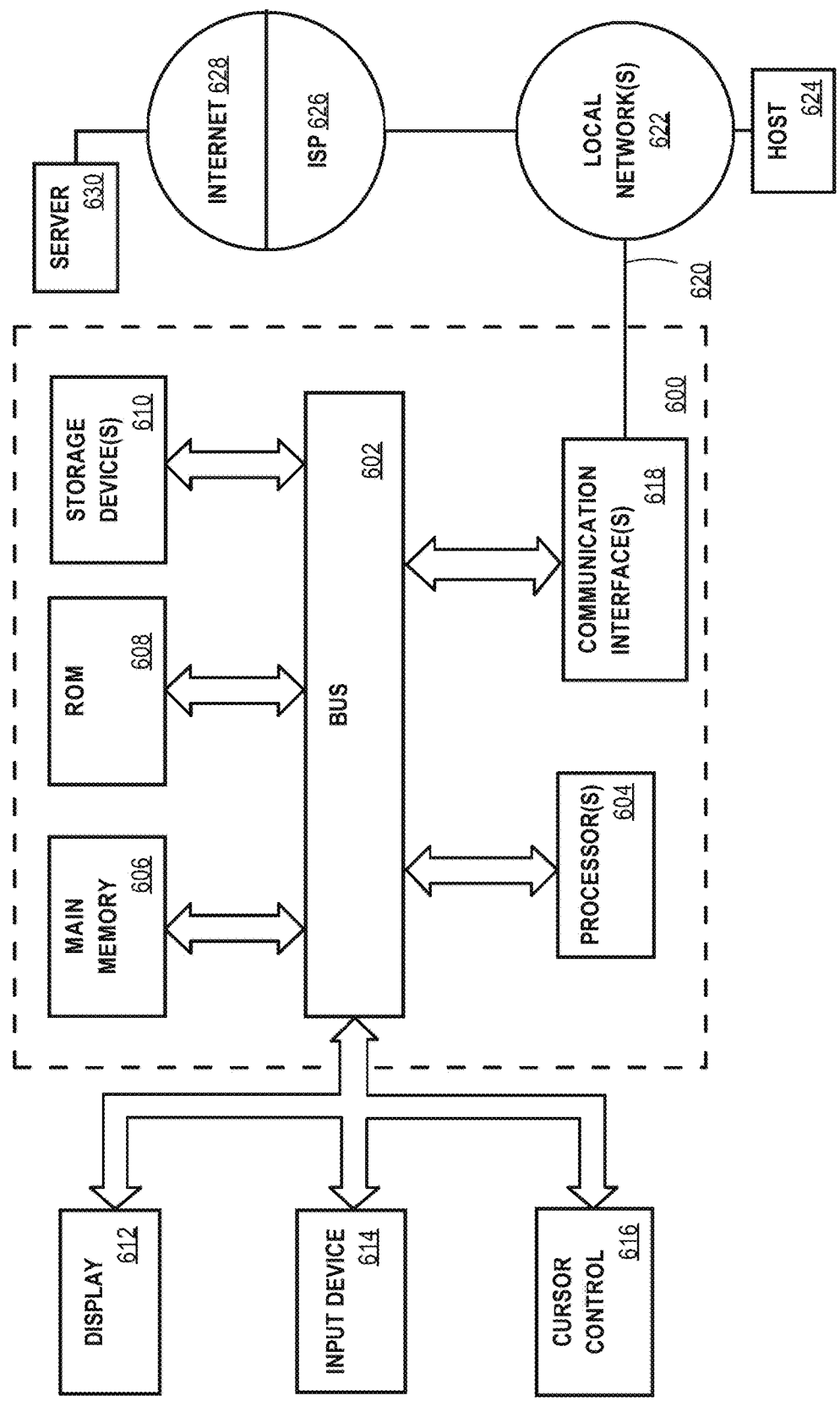
FIG. 6 is a block diagram of a computing device in which the example embodiment(s) of the present invention may be embodied.

Referring now to FIG. 6, it is a block diagram that illustrates a computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 6, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

5.0 Implementation Mechanisms—Software Overview

Figure 7:
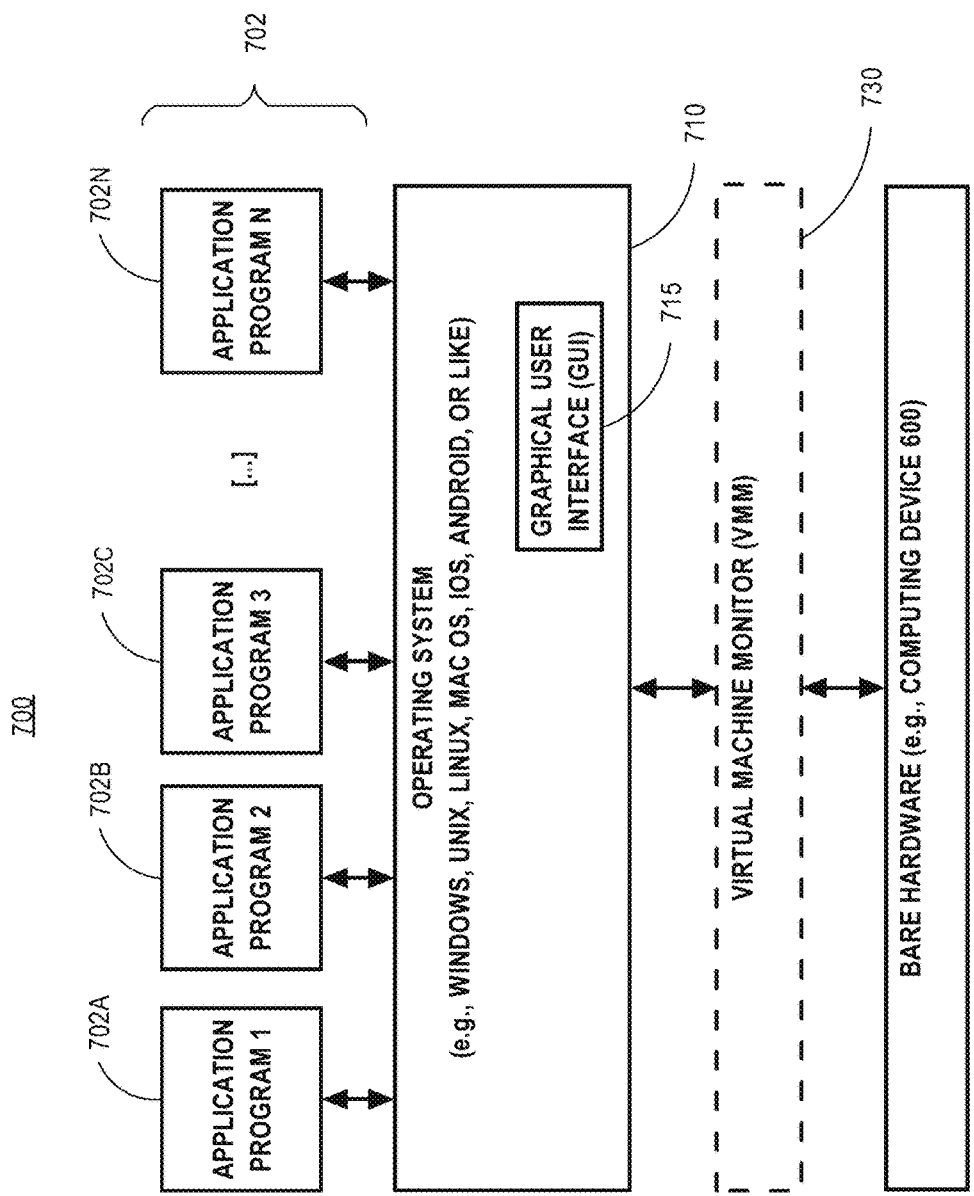
FIG. 7 is a block diagram of a software system for controlling the operation of the computing device.

FIG. 7 is a block diagram of a software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

The present disclosure provides improved monitoring of data pipelines. Data pipelines that include multiple subsystems are fragile, as any single break in the pipeline could affect one or more downstream subsystems. Additionally, complex data pipelines with hundreds or thousands of pipeline subsystems can be particularly challenging to monitor, as there are numerous types of pipeline subsystems that need to be abstracted into a user interface that is easy to understand. An inability to monitor such complex and fragile pipelines can lead to system downtime and challenges to troubleshooting issues facing the pipeline subsystems. The teachings of the present disclosure allow for customized monitoring of pipeline subsystems and allow users to remedy and correct those issues before they cause widespread issues downstream. The present disclosure allows for customized collection of data objects across different and varied pipeline subsystems. Data objects can include both current status data objects and event data objects, thereby allowing the data monitoring system to monitor both the current health of the pipeline as well as historical issues that have faced the pipeline. Combining both current status data objects and event data objects into a single monitoring tool provides users with helpful aggregate overview of the health of the pipeline and its subsystems when working to resolve outstanding issues.

The present disclosure provides for deployment of customized validators based on any type of data object collected from a pipeline subsystem. Validators can be customized using scripting languages, regular expressions, query languages, and other tools, to provide precise insight into the health status of the pipeline subsystems. The present disclosure provides for customized notifications to end devices based on validation values generated by validators, furthermore allowing for selective and specific alerts to be sent to interested parties based on the pipeline subsystems being affects and/or the severity of the validation value generated.

The present disclosure provides for a flexible and accessible dashboard that allows for users to quickly and easily navigate validation values when trying to resolve pipeline issues.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method providing an improvement in monitoring pipelined data transformation processes in distributed computer systems, the method comprising:
   receiving an event data object that indicates a historical status of one or more subsystems of a pipeline;
   receiving a current status data object that indicates a current status of one or more subsystems of a pipeline;
   analyzing the event data object to determine a first validation value of the event data object by applying a first validation criteria to the event data object;
   analyzing the current status data object to determine a second validation value of the current status data object by applying a second validation criteria to the current status data object;
   each of the first validation criteria and the second validation criteria comprising any of a programming instruction, script, query, configuration file, or business logic that validates the event data object or the current status data object to determine values that represents characteristics of a health state of the pipeline;
   based on determining that the first validation value is not valid, causing to be displayed in a graphical user interface the first validation value;
   based on determining that the second validation value is not valid, causing to be displayed in the graphical user interface the second validation value;
   wherein the method is performed using one or more processors.

2. The method of claim 1, further comprising:
   causing to be displayed in the graphical user interface a summary card for the one or more subsystems that summarizes the first validation value and the second validation value.

3. The method of claim 2, wherein the summary card for the one or more subsystems further comprises a plurality of numerical values, wherein each numerical value indicates a number of validation values associated with a particular status type for the one or more subsystems.

4. The method of claim 2, further comprising:
causing to be displayed in the summary card a graph of one or more prior validation results for the one or more subsystems.

5. The method of claim 4, wherein the graph comprises a line graph.

6. The method of claim 4, wherein the graph comprises a histogram.

7. The method of claim 1, wherein a source of the event data object is an event log.

8. The method of claim 1, wherein the current status data object comprises information regarding one or more of: disk space, memory usage, and central processing unit (CPU) usage.

9. A system providing an improvement in monitoring pipelined data transformation processes in distributed computer systems, the system comprising:
one or more processors;
one or more non-transitory computer-readable storage media storing sequences of instructions which, when executed by the one or more processors, cause the one or more processors to perform:
receiving an event data object that indicates a historical status of one or more subsystems of a pipeline;
receiving a current status data object that indicates a current status of one or more subsystems of a pipeline;
analyzing the event data object to determine a first validation value of the event data object by applying a first validation criteria to the event data object;
analyzing the current status data object to determine a second validation value of the current status data object by applying a second validation criteria to the current status data object;
each of the first validation criteria and the second validation criteria comprising any of a programming instruction, script, query, configuration file, or business logic that validates the event data object or the current status data object to determine values that represents characteristics of a health state of the pipeline;
in response to determining that the first validation value is not valid, causing to be displayed in a graphical user interface the first validation value; and
in response to determining that the second validation value is not valid, causing to be displayed in the graphical user interface the second validation value.

10. The system of claim 9, further comprising sequences of instructions which, when executed by the one or more processors, cause the one or more processors to perform:
causing to be displayed in the graphical user interface a summary card for the one or more subsystems that summarizes the first validation value and the second validation value.

11. The system of claim 10, wherein the summary card for the one or more subsystems further comprises a plurality of numerical values, wherein each numerical value indicates a number of validation values associated with a particular status type for the one or more subsystems.

12. The system of claim 10, further comprising sequences of instructions which, when executed by the one or more processors, cause the one or more processors to perform:
causing to be displayed in the summary card a graph of one or more prior validation results for the one or more subsystems.

13. The system of claim 12, wherein the graph comprises a line graph.

14. The system of claim 12, wherein the graph comprises a histogram.

15. The system of claim 9, wherein a source of the event data object is an event log.

16. The system of claim 9, wherein the current status data object comprises information regarding one or more of: disk space, memory usage, and central processing unit (CPU) usage.

17. One or more non-transitory computer-readable media storing one or more sequences of instructions, providing an improvement in monitoring pipelined data transformation processes in distributed computer systems and which, when executed by one or more processors, cause:
receiving an event data object that indicates a historical status of one or more subsystems of a pipeline;
receiving a current status data object that indicates a current status of one or more subsystems of a pipeline;
analyzing the event data object to determine a first validation value of the event data object by applying a first validation criteria to the event data object;
analyzing the current status data object to determine a second validation value of the current status data object by applying a second validation criteria to the current status data object;
each of the first validation criteria and the second validation criteria comprising any of a programming instruction, script, query, configuration file, or business logic that validates the event data object or the current status data object to determine values that represents characteristics of a health state of the pipeline;
in response to determining that the first validation value is not valid, causing to be displayed in a graphical user interface the first validation value; and
in response to determining that the second validation value is not valid, causing to be displayed in the graphical user interface the second validation value.

18. The one or more non-transitory computer-readable media of claim 17, further comprising instructions, which, when executed by one or more processors, cause:
causing to be displayed in the graphical user interface a summary card for the one or more subsystems that summarizes the first validation value and the second validation value.

19. The one or more non-transitory computer-readable media of claim 18, wherein the summary card for the one or more subsystems further comprises a plurality of numerical values, wherein each numerical value indicates a number of validation values associated with a particular status type for the one or more subsystems.

20. The one or more non-transitory computer-readable media of claim 18, further comprising instructions, which, when executed by one or more processors, cause:
causing to be displayed in the summary card a graph of one or more prior validation results for the one or more subsystems.

* * * * *